United States Patent
Santos et al.

(10) Patent No.: US 8,187,499 B2
(45) Date of Patent: May 29, 2012

(54) COMPOSITION INTENDED TO BE APPLIED IN STEELS FOR CORROSION PROTECTION OF THEIR SURFACES AND PROCESS FOR PREPARING THE SAME

(75) Inventors: Saint-Clair Dantas Oliveira Santos, Freguesia (BR); Luiz Roberto Martins De Miranda, Petrópolis (BR); Bluma Guenther Soares, Leme (BR); Paulo Roberto Araújo Martins, Volta Redonda (BR)

(73) Assignees: IPQM-Instituto de Pesquisas da Marinha, Rio de Janeiro (BR); COPPE/UFRJ-Coordenacao dos Programas de Pos Graduacao de Engenharia da Universidade Federal do Rio de Janeiro, Rio de Janeiro (BR)

( * ) Notice: Subject to any disclaimer, the term of this patent is extended or adjusted under 35 U.S.C. 154(b) by 738 days.

(21) Appl. No.: 12/223,954

(22) PCT Filed: Feb. 14, 2007

(86) PCT No.: PCT/BR2007/000040
§ 371 (c)(1),
(2), (4) Date: Aug. 13, 2008

(87) PCT Pub. No.: WO2007/104117
PCT Pub. Date: Sep. 20, 2007

(65) Prior Publication Data
US 2009/0020729 A1    Jan. 22, 2009

(30) Foreign Application Priority Data
Mar. 10, 2006    (BR) ...................................... 0600814

(51) Int. Cl.
C09K 15/02    (2006.01)
C09K 15/18    (2006.01)
C23F 11/00    (2006.01)
C23F 11/14    (2006.01)
C23F 11/18    (2006.01)
C23C 18/32    (2006.01)
C09D 1/00    (2006.01)
C04B 14/30    (2006.01)

(52) U.S. Cl. .............. 252/389.53; 252/390; 252/400.53; 252/401; 106/1.27; 106/14.05; 106/14.37; 106/286.3; 106/460

(58) Field of Classification Search ............. 252/389.53, 252/390, 400.53, 401; 106/1.27, 14.05, 14.37, 106/286.3, 460
See application file for complete search history.

(56) References Cited

U.S. PATENT DOCUMENTS

| | | | |
|---|---|---|---|
| 5,645,890 A * | 7/1997 | MacDiarmid et al. ........ | 427/302 |
| 5,658,649 A * | 8/1997 | Wrobleski et al. ............ | 428/215 |
| 5,779,818 A * | 7/1998 | Wessling ...................... | 148/240 |
| 5,853,621 A * | 12/1998 | Miller et al. .................. | 252/500 |
| 2003/0185990 A1 * | 10/2003 | Bittner et al. ................. | 427/385.5 |
| 2005/0249883 A1 * | 11/2005 | Buettner et al. .............. | 427/405 |
| 2008/0000383 A1 * | 1/2008 | Nagai et al. .................. | 106/14.44 |
| 2008/0017832 A1 * | 1/2008 | Funaoka et al. .............. | 252/500 |
| 2009/0020729 A1 * | 1/2009 | Santos et al. ................. | 252/392 |
| 2010/0010119 A1 * | 1/2010 | Zaarei et al. .................. | 523/461 |
| 2010/0203343 A1 * | 8/2010 | Takada et al. ................. | 428/418 |

* cited by examiner

Primary Examiner — Joseph D Anthony
(74) Attorney, Agent, or Firm — Fildes & Outland, P.C.

(57) ABSTRACT

The invention is related to a composition destined to protect steels against corrosion by utilization of the steel's own rust as a passivating element, the rust being removed from the steel and/or being synthetically prepared and agglutinated with a resin, where the resin can have or cannot have as an electric conductivity promoter material an intrinsically conductor polymer (ICP), in this case polyaniline, in its conducting form (emeraldine salt) or non conducting (emeraldine base), besides filler(s) and a dispersant oil.

15 Claims, No Drawings

COMPOSITION INTENDED TO BE APPLIED IN STEELS FOR CORROSION PROTECTION OF THEIR SURFACES AND PROCESS FOR PREPARING THE SAME

The present invention is related to a coating composition of iron surfaces and its alloys, which can be applied not only through conventional methods, e.g. paintbrush and/or paint gun, but also electrophoresis.

The atmospheric corrosion of iron and its alloys can be diminished, or even completely suppressed, by utilization of certain coatings such as nickel, chrome, and organic coatings, and more commonly by paints and varnishes.

In this last technique, the surface is prepared, sandblasted and in the following coated with primer materials and then coated with a pigmented coating paint with a predetermined color. The paint durability is a function of the nature of the substance employed in its formulation as well as the environmental conditions and application method.

However, it is generally accepted that paint is a material, which gives a high electrochemical potential, i.e., anodic values, which assure a perfect surface passivation. In zinc rich paints the mechanism is opposite, i.e., with the zinc pigment the metal surface acquires cathodic values that assure a perfect metal "immunity".

For its turn, the iron oxidation in urban-industrial, marine or rural atmospheres gives to the metal intermediate values of potential, i.e., the spontaneously formed "rust" on the metal surface is not, generally, perfectly passivating.

A notable exception is the case of low-carbon steels of the family ASTM-A242, the so-called weathering steel, which forms a protective rust in places where there are not chloride ions.

The scope of the present invention is the utilization of coatings which maintain the metal surface in a potential similar to the spontaneous potential acquired by the metal in places where it is located, allowing a protective protection against atmospheric corrosion to the same.

In this manner, in marine atmospheres, where the rusted steel electrode potential is in the range from −300 to −100 milivolts in relation to the saturated calomel electrode, the surface can be coated with a pigmented suspension of magnetite $Fe_3O_4$, where a resin is added as a carrier, an intrinsically conductor polymer can be added or not as a promoter material of electric conductivity (ICP), the polyaniline, in its formulation so as to confer to the metal potentials between this range.

In a similar manner in urban and/or industrial atmospheres, where the rusted steel electrode potential is in the range from −100 to −500 milivolts in relation to the saturated calomel electrode, the surface can be coated with a pigmented suspension of goethite, $\alpha$-FeOOH, which a resin is equally added as a carrier, an intrinsically conductor polymer can be added or not as a promoter material of electric conductivity (ICP), the polyaniline, in its formulation so as to confer to the metal potentials between this range.

Such methodology differs integrally from the normally employed by the traditional painting systems where, after cleaning the surface, it is applied successively a primer coating of high value of electrode potential and many finishing coatings performing in this manner a barrier that isolates the surface from the aggressive environment.

The present invention is basically innovating in what is concerned to the formulation of a paint: here the principle is to begin with the rust determination naturally formed by nature; following, in case where the amount of formed rust be enough, recover the rust from rusted surface and, after its identification and milling, it is added resin as a carrier, an intrinsically conductor polymer can be added or not as a promoter material of electric conductivity (ICP), the polyaniline, in its formulation, whose conducting or not-conducting state will depend on the end to which the coating is destined.

The polyaniline to be used together with the protective rust, when the conductor form be employed, should be the emeraldine salt, however when there is the need of using it in its non-conducting form it will be used the emeraldine base.

The emeraldine salt constitutes the polyaniline protonated form, where it is obtained the highest value of electric conductivity. The polyaniline protonation is obtained by chemical via with the employment of sulphonic acids, such as: dodecylbenzene sulphonic, camforsulphonic acid, p-toluene sulphonic acid and naphthalene sulphonic acid or through the use of phosphonic acids. The protonating agent employed to obtain the emeraldine salt should be preferentially the dodecylbenzene sulphonic acid. (DBSA).

The inclusion of polyaniline can be done in two ways, the first one from the mechanical mixture to the resin during the paint manufacture process, the second from the pre-addition of polyaniline to the resin before the paint manufacture, i.e., through in situ polyaniline synthesis in presence of the resin.

When there is not enough amount of rust to be collected, the oxide(s) formed from nature will be synthetically manufactured and the above referred operations of milling, carrier and additives addition.

As above mentioned the main problems caused due to the application of the painting traditional systems are of electrochemical nature. As such, the iron, which is not a noble material, in this manner under spontaneous oxidation, is coated with a noble substance, the paint, which does not alter its properties under ambient exposure. It is enough, however, any mechanical action, as for example an scratch on the painted surface to the metallic substrate suffers oxidation and occurs rust production, which by its turn will deteriorate the applied paint.

The present invention eliminates this problem, once the applied coating being of the same nature of the rust that will be formed spontaneously will diminish the existing electrochemical potential difference between the rust and metal surface, thus diminishing drastically the corrosion velocity.

The process is based essentially on the POURBAIX formula, $(E-E_0)\cdot i \geqq 0$, where E is the electrochemical potential that a certain surface acquires when exposed in a certain electrolyte and $E_0$ is the equilibrium electrolytic potential calculated with the free energy values of the bodies present in the system. The $(E-E_0)$ difference is called over tension and i is the current intensity originated from this potential difference. The corrosion of a metal is therefore accompanied by a "current" liberation, which by Faraday's law, corresponds to a determined mass loss. Thus, in relation to the iron, one miliampere current corresponds to 9.1 g of dissolved iron.

Based, in this manner, in the above formula the process aims to coat the iron surface (steel) with an oxide that, in an specific environment diminishes sensitively the over tension $(E-E_0)$ value causing in this way a respective reduction in the current, i.e., consequently the corrosion rate.

For such over tension value reduction and consequently current reduction i is important that the agglomerating carrier, the resin allows an electric path between the pigmented dispersion matrix and metallic surface, the steel, in such a way to keep for all the surface an equipotential identical to the rust spontaneously formed on it. Starting from this premise it was made the option for the addition of a intrinsically conductor polymeric material (ICP), the polyaniline, that was soluble in the agglomerating carrier, the resin, and which could furnish to it the electric conductivity property, which is a metal characteristic.

In this manner, the electrode potentials of the coated surfaces with these paints converge more quickly to the values found to the rusted electrode potentials acquired for the metal when exposed in its work environment, being it marine or urban and/or industrial.

The table below indicates the main oxides found in urban, marine and rural atmospheres as well the measured electrode potential values.

| ATMOSPHERE | TYPES OF OXIDES | Eecs VALUES |
|---|---|---|
| URBAN/INDUSTRIAL | $Fe_3O_4$, $\gamma$-FeOOH e $\alpha$-FeOOH | −200 a +100 |
| MARINE | $Fe_3O_4$, $\gamma$-FeOOH, $\alpha$-FeOOH e $\beta$-FeOOH | −300 a +250 |
| RURAL | $Fe_3O_4$ e $\gamma$-FeOOH | −300 a +200 |

Rust Constituints Oxides Manufacturing

The main oxides found in rusts are: 1) $Fe_3O_4$ (magnetite), 2) $\alpha$-FeOOH (goethite), 3) $\beta$-FeOOH (akaganeite, 4) $\gamma$-FeOOH (lepidocrocite)) e 5) Amorphous matter.

$Fe_3O_4$ and $\gamma$-FeOOH are found practically in all rusts; $\alpha$-FeOOH is typically a rust product well consolidated at urban/industrial atmospheres; $\beta$-FeOOH is typically of marine corrosion.

$Fe_3O_4$ Obtainment

The magnetite is obtained by the mixture of $FeSO_4$ and $Fe_2(SO_4)_3$, acidified with $H_2SO_4$ 1 N until pH=2.0. The experiment is conducted in an oxygen free environment, followed by the solution alkalinization until pH=10.0 with NaOH 1 N.

$\alpha$-FeOOH Obtainment $\alpha$-FeOOH is obtained by slow oxidation of a ferrous hydroxide solution $Fe(OH)_2$, oxygen free. For its turn the $Fe(OH)_2$ is obtained by the mixture of $FeSO_4$ and NaOH. The $Fe(OH)_2$ oxidation in $\alpha$-FeOOH is obtained by oxygenation of the suspension. At the end of oxidation the $Fe(OH)_2$ solution is filtered and the residue is dried in an oven.

$\gamma$-FeOOH Obtainment

The obtaining process of $\gamma$-FeOOH is effectuated in the same manner as the $\alpha$-FeOOH obtainment, with a notable difference of considerably increase oxygenation in the last oxidation step of $FE(OH)_2$ suspension.

$\beta$-FeOOH Obtainment $\beta$-FeOOH can be obtained by simple $FeCl_3$ hydrolysis in solution and further drying.

Amphorphous Matter Obtainment

From goethite, $\alpha$-FeOOH, as described above, with the difference of drastically oxygenation reduction in the last $Fe(OH)_2$ oxygenation step.

Once the oxides are obtained, and one of them or a mixture thereof identified with the naturally found rust is chosen, the next operation consists of milling until a granulometry equal or superior to 150 mesh, followed by mixing with the suitable resin containing the intrinsically conductor polymer (ICP) or not, the polyaniline. A typical example is given in the following table (weight composition).

| COMPONENT | WEIGHT PERCENT (weight %) |
|---|---|
| Magnetite, $Fe_3O_4$ | 48.9 |
| Epoxy Resin | 38.7 |
| Polyaniline | 7.7 |
| Filler | 3.2 |
| Dispersant Oil | 1.5 |

For a better coating performance the passage of the above mixture is performed in a suitable mill with the objective of homogenizing it and to give a compatible consistency with the paint.

Typical concentration ranges in weight of the ferruginous material are from 45 to 60%, from 35 to 45% of resin, from 2 to 10% of polyaniline, from 2 to 5% of filler and from 0.5 to 2% of dispersant oil.

The invention claimed is:

1. Composition destined to be applied on steels for protection of their surfaces against corrosion, comprising from 45 to 60% by weight of a rust which is the own natural rust of steel or a synthetically prepared rust with the same chemical composition of the referred natural rust, from 35 to 45% by weight of an agglutinant resin, from 2 to 10% of polyaniline, from 2 to 5% of filler and from 0.5 to 2% of dispersant oil.

2. Composition according to claim 1, characterized by in an urban and/or industrial atmosphere the rust is composed basically of magnetite ($Fe_3O_4$), lepidocrocite ($\gamma$-FeOOH) and goethite ($\alpha$-FeOOH).

3. Composition according to claim 1, characterized by in a marine atmosphere the rust is composed basically of magnetite ($Fe_3O_4$), akaganeite ($\beta$-FeOOH), goethite ($\alpha$-FeOOH) and lepidocrocite ($\gamma$-FeOOH).

4. Composition according to claim 1, characterized by in a rural atmosphere the rust is composed basically of magnetite ($Fe_3O_4$).

5. Composition according to claim 2, characterized by the rust comprises amorphous matter.

6. Process for preparation of a composition according to claim 1, characterized by the steel natural rust is removed through a mechanical procedure and rust agglutination occurs with the addition a suitable agglutinant resin, where polyaniline is added, a filler is added and a dispersant oil is added to give fluidity to the composition, where the amount of rust in the composition can be totally or partially constituted of a synthetic material having the same basic composition of the steel natural rust.

7. Process according to claim 6, characterized by the synthetic material includes magnetite obtained by the $Fe_3O_4$ and $Fe_2(SO_4)_3$ mixture, acidifying with $H_2SO_4$ 1 N to about pH=2.0 in a oxygen free environment; followed by solution alkalinization to about pH=10 with NaOH 1 M.

8. Process according to claim 6, characterized by the synthetic material includes goethite ($\alpha$-FeOOH) obtained by slow oxidation of a ferrous hydroxide $Fe(OH)_2$ solution, free of oxygen, being the $Fe(OH)_2$, for its turn obtained by the $FeSO_4$ and NaOH mixture, the $Fe(OH)_2$ oxidation is filtered and the residue is dried in an oven.

9. Process according to claim 8, characterized by to obtain lepidocrocite ($\gamma$-FeOOH) the oxygenation at the last oxidation step of the $Fe(OH)_2$ suspension is considerably increased.

10. Process according to claim 6, characterized by the synthetic material includes akaganeite ($\beta$-FeOOH) obtained by $FeCl_3$ hydrolysis in solution and further drying.

11. Process according to claim 8, characterized by to obtain the amorphous matter, the oxygenation is drastically reduced at the last oxidation step of the $Fe(OH)_2$ suspension.

12. Process according to claim 6, characterized by the composition is passed in a mill, until a granularity superior or equal to 150 mesh, before the mixture with the resin.

13. Process according to claim 12, characterized by the milled and mixed composition is passed in another mill for homogenization.

14. Composition according to claim 3, characterized by the rust comprises amorphous matter.

15. Composition according to claim 4, characterized by the rust comprises amorphous matter.

\* \* \* \* \*